United States Patent [19]
Suran et al.

[11] Patent Number: 5,490,575
[45] Date of Patent: Feb. 13, 1996

[54] ACTIVE SEAT BELT CONTROL SYSTEM WITH BUILT IN INTERIA SENSOR

[75] Inventors: Michael J. Suran, Clarkston; Michel Trumbo, Troy, both of Mich.

[73] Assignee: Chrysler Corporation, Highland Park, Mich.

[21] Appl. No.: 352,463

[22] Filed: Dec. 9, 1994

[51] Int. Cl.$^6$ .................. B60R 22/343; B60R 22/41
[52] U.S. Cl. .................. 180/270; 180/286; 280/806; 242/384.1; 297/477
[58] Field of Search .................. 280/806, 807, 280/803; 180/286, 270, 268; 242/384.1, 383.1; 297/477, 478, 480, 476; 307/10.1

[56] References Cited

U.S. PATENT DOCUMENTS

| | | | |
|---|---|---|---|
| 4,235,455 | 11/1980 | Collins et al. | 280/806 |
| 4,703,950 | 11/1987 | Pickett | 280/806 |
| 4,708,364 | 11/1987 | Doty | 280/806 |
| 4,749,212 | 6/1988 | Ueda et al. | 280/803 |
| 4,796,916 | 1/1989 | Rogers et al. | 280/806 |
| 4,832,365 | 5/1989 | Kawai et al. | 180/286 |
| 4,896,741 | 1/1990 | Kawai et al. | 180/268 |
| 5,037,133 | 8/1991 | Kataoka et al. | 180/268 |
| 5,088,769 | 2/1992 | Furuhashi | 280/803 |

FOREIGN PATENT DOCUMENTS

| | | | |
|---|---|---|---|
| 3629316 | 3/1988 | Germany | 180/268 |
| 1583443 | 1/1981 | United Kingdom | 280/806 |

Primary Examiner—Margaret A. Focarino
Assistant Examiner—Peter C. English
Attorney, Agent, or Firm—Christopher A. Taravella

[57] ABSTRACT

Control system for controlling the locking and unlocking of seat belt retractors in response to the opened/closed state of the vehicle doors and also the on/off state of the ignition switch.

7 Claims, 4 Drawing Sheets

R_X AND C_X ARE EXTERNAL COMPONENTS.
$V_{DD}$ = PIN 16
$V_{SS}$ = PIN 8, PIN 1, PIN 15

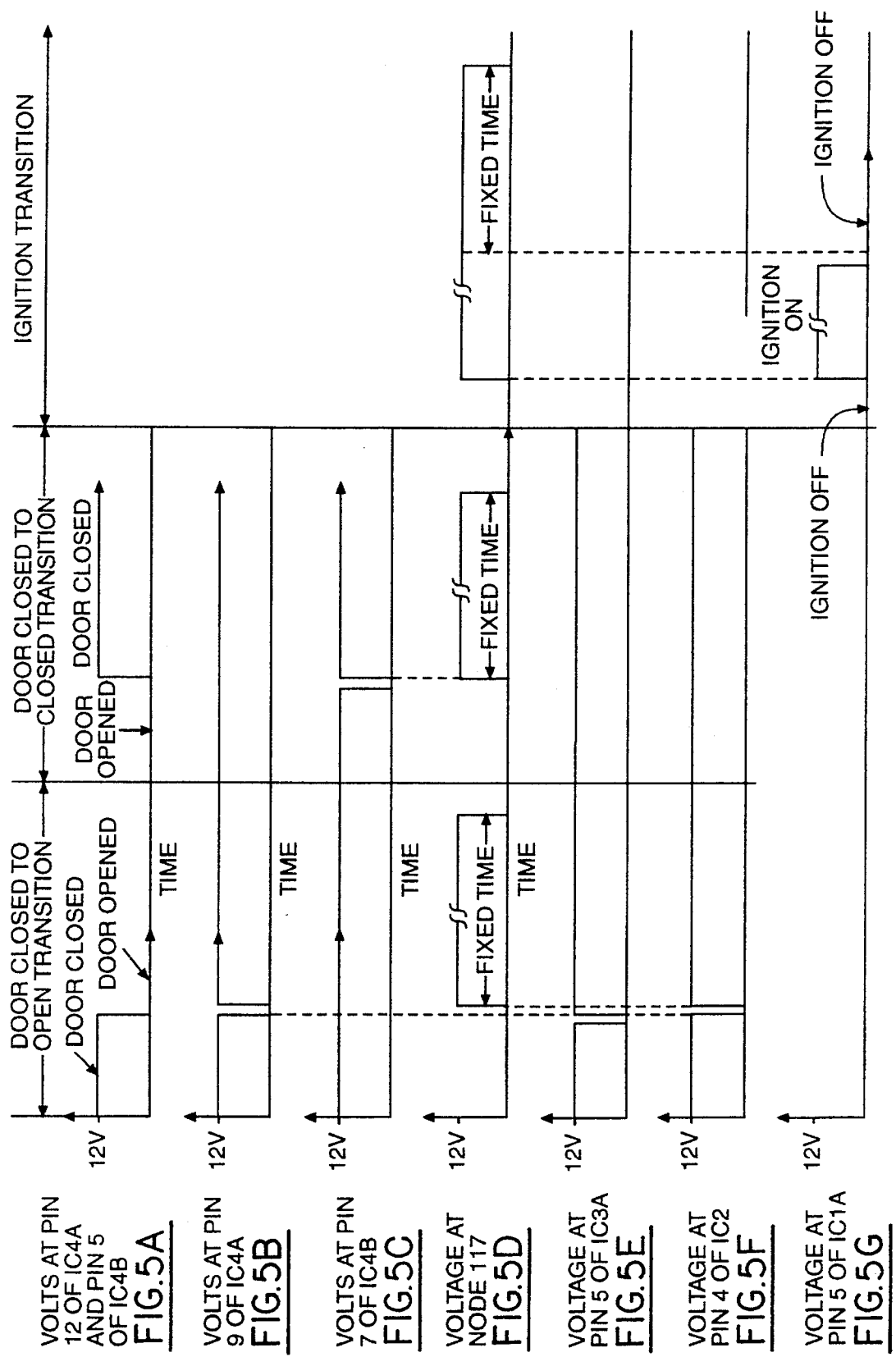

ACTIVE SEAT BELT CONTROL SYSTEM WITH BUILT IN INTERIA SENSOR

FIELD OF THE INVENTION

The present invention generally relates to an active seat belt control system for controlling the locking and unlocking of seat belt retractors in a vehicle, and more particularly, relates to an active seat belt control system for controlling the locking and unlocking of seat belt retractors in a vehicle incorporating a logic and timer circuit with a built-in inertia sensor.

BACKGROUND OF THE INVENTION

Safety seat belt systems have been used in motor vehicles for many years. Traditionally, active seat belt systems have been used that require the occupant to actively participate in securing the belt and providing a safe driving environment. More recently, passive seat belt systems have also been used in the automotive industry which do not require the vehicle occupant to actively participate in securing the belt. Instead, a seat belt is automatically fastened around the occupant when he is in a seated position. This type of passive seat belt system has caused some degree of inconvenience to the drivers and passengers alike and consequently, has met considerable consumer resistance in using such passive systems. As a consequence, a combination of an active seat belt system and a passive restraint system (such as airbags) has been employed by many automobile manufacturers. This combination provides the convenience of an active seat belt system while still providing maximum protection when used with airbags.

In a conventional active seat belt system, an inertia sensor is used as an impact sensor and is mechanically linked to the seat belt retraction system. When the vehicle experiences a sudden deceleration, acceleration or sharp cornering, the inertia sensor senses such sudden motion and locks the seat belt retractor thereby retaining the seat belts securely on the driver or passenger. In more recent vehicle interior designs, seat belts are frequently integrated into the vehicle seat and mounted therein with a seat belt retractor.

This type of integrated vehicle seat/seat belt system is also desirable for vehicles equipped with convertible roofs. In these vehicles, the seat belt and the seat belt retraction system are mounted in the seat since there is no convenient pillar for mounting the turning loop. In some convertible vehicles, the seat belt retractor is mounted in the lower part of the vehicle body and the seat belt extends from the retractor, over the shoulder of the vehicle seat, through a harness and down to the lower part of the vehicle body. This design can cause discomfort to the seat belt wearer.

When a seat belt and a seat belt retraction system are mounted in the upper part of the vehicle seat, the inertia sensor which is normally mounted to the seat belt retractor can no longer be mounted together with the retractor. This is because the seat back of a vehicle seat is frequently tilted or reclined by a driver or a passenger for optimum comfort. In such applications, the change in orientation of the inertia sensor must be accounted for in order for the inertia sensor to operate properly. It is therefore desirable to mount the inertia sensor remotely from the seat belt retractor when the seat belt retractor is mounted in the vehicle seat. This type of remotely mounted inertia sensor for controlling a seat belt retraction system has been proposed by others.

One of such prior art method proposes mounting of an inertia sensor in the vehicle floor. In such applications, the inertia sensor functions as an electrical switch. When vehicle electrical current is turned on, current is fed to the system such that when the inertia sensor senses a sudden movement of the vehicle, it sends an electrical signal to either turn on or turn off a solenoid. The solenoid deactivates the seat belt retractor and locks the belt. One problem with such a system is that prior to the ignition switch being turned on, the seat belt retraction system is locked and as a consequence, the belt cannot be fastened by the driver or the front seat passenger of the vehicle. This type of ignition switch activated seat belt system is inconvenient. For instance, when the driver opens the vehicle door to fasten a child seat, the seat belt cannot be extended unless the ignition switch is already turned on. Furthermore, as soon as the ignition switch is turned off, the seat belt retractor is locked preventing any movement of the seat belt. This is inconvenient if the driver is still strapped in the seat belt. For instance, his motion will be restricted and he is prevented from reaching out and picking up personal item (e.g. an umbrella) from the floor area of the passenger seat.

It is therefore an object of the present invention to provide an active seat belt control system that can be mounted remotely from the vehicle seat to control the locking and unlocking of the seat belt retraction system.

It is another object of the present invention to provide an active seat belt control system that is remotely mounted from the vehicle seat that is not solely controlled by the vehicle ignition switch.

It is a further object of the present invention to provide an active seat belt control system that incorporates a logic circuit such that the seat belt retraction system is operable prior to and after the ignition switch is turned on or off.

It is yet another object of the present invention to provide an active seat belt control system that is remotely mounted from the vehicle seat and controlled by a logic and timer circuit equipped with a built-in inertia sensor.

SUMMARY OF THE INVENTION

In accordance with the present invention, an active seat belt control system for controlling the locking and unlocking of the seat belt retractors in a vehicle incorporating a timer and a logic circuit is provided.

In the preferred embodiment, an active seat belt control system is provided that operates electronically and is used to replace a conventional system that operates mechanically. A solenoid is mounted with the seat belt retractor in the upper portion of the vehicle seat to perform the locking and unlocking function when a signal is received from an inertia sensor through the seat belt control system. The inertia sensor is remotely mounted at a convenient location inside a logic and timer module. The solenoid is equipped with a lever arm to engage gears which in turn lock or unlock the seat belt retractor. The present invention enables a vehicle designer to mount an inertia sensor in a remote location from the vehicle seats such that the seat movement does not affect the operation of the seat belt control system. A single inertia sensor can be used to control the seat belt retractor systems for both the front seats.

The preferred embodiment provides an electronic logic and timer circuit that includes a built-in inertia sensor. The timer circuit is triggered indirectly by a detection means responsive to the opening and closing of the vehicle doors wherein the detection means generates an output signal indicating a change in status of the doors. For instance, when a door opening signal is received by the logic circuit, the seat belt retractor remains unlocked for a predetermined period of time. If during that time the ignition switch of the vehicle is turned on, the seat belt retractor will remain unlocked (for as long as the ignition switch is turned on) unless the inertia sensor senses a sudden deceleration of the vehicle. When the ignition switch of the vehicle is turned off, the ignition switch sends a signal to the timer which in turn provides current to the solenoid and continues to deactivate the locking system of the seat belt retractor for a predetermined period of time. During such period of time, the seat belt wearer can freely move without being restrained by a locked seat belt.

The preferred embodiment further includes a built-in inertia sensor incorporated into the logic/timer circuit module to achieve a more reliable, a faster responding and a more serviceable system.

BRIEF DESCRIPTION OF THE DRAWINGS

Other objects, features and advantages of the present invention will become apparent upon consideration of the specification and the appended drawings, in which:

FIG. 5A through 5G are timing diagrams showing the signal timing for the seat belt control system of FIG. 1.

DETAILED DESCRIPTION OF THE PREFERRED EMBODIMENTS

Figure 1:
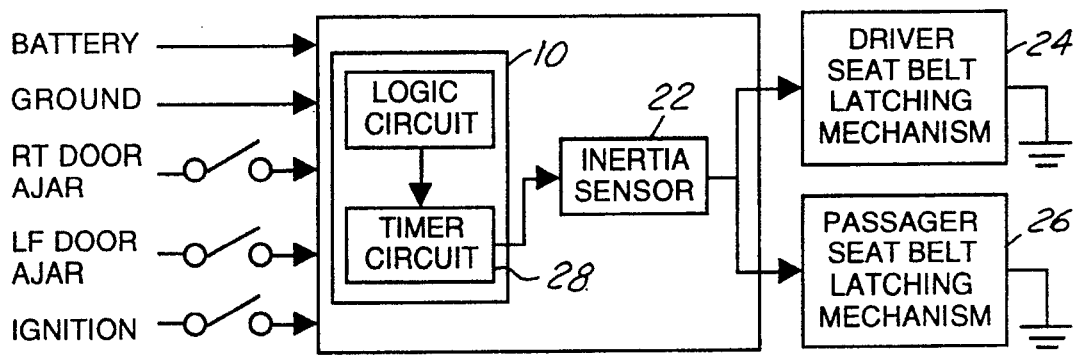
FIG. 1 is a general electrical block diagram of the active seat belt control system of the present invention.

The present invention utilizes an electronic active seat belt control system incorporating a logic and timer circuit equipped with a built-in inertia sensor to replace a mechanical/electrical seat belt control system.

In the preferred embodiment, the present invention supplants an inertia sensor that is commonly used in a seat belt retractor mechanism with a solenoid such that the locking and unlocking of the retractor is controlled electronically and not mechanically. The electronically controlled solenoid is equipped with a lever arm to engage or disengage a set of gears thus locking or unlocking the seat belt retraction system. Utilizing this design, the inertia sensor can be mounted at a remote location away from the vehicle seat and as a consequence, the seat orientation does not affect the operation of the inertia sensor. Furthermore, only one inertia sensor is needed to control the seat belt retractors in both the driver's and the passenger's seats. The inertia sensor can be suitably mounted on the vehicle floor between the front seats. The inertia sensor senses a preset level of deceleration or acceleration with a 360° range of sensitivity and interrupts the current to the solenoids thereby locking the seat belt retractors.

The present invention further incorporates a timer that is activated by a change in door status. This enables the solenoids to unlock the retractor systems, for a preset length of time before the ignition switch is turned on. More specifically, the system is connected to a door ajar switch which is activated when the vehicle door is opened. The timer starts when the door is opened to allow the driver or passenger for a predetermined length of time to pull on the seat belt and to fasten it before the ignition switch is turned on. This timer system also allows for a preset length of time during which the solenoids remain energized after the ignition switch is turned off. This is accomplished by utilizing a detection system that monitors the ignition switch state. For instance, the system is connected to the ignition switch and is activated when the ignition is turned off. The timer starts when the ignition is turned off to allow the retractors to remain unlocked for a predetermined length of time.

The present system therefore is much easier to use and more user-friendly than conventional systems wherein the seat belt cannot be used until the ignition switch is turned on. In such conventional systems, the inertia sensor receives its power directly from the ignition switch in order to turn power on or off to the solenoids. When the ignition switch is off, no power is supplied to the solenoids and the seat belt retractors are locked and inoperative.

Another benefit provided by the present invention is that the seat belts remain operative after the ignition switch is turned off. This is contrary to those conventional seat belt control system in which the seat belt retractor is locked as soon as the ignition switch is turned off. The present invention therefore provides the additional convenience to a driver or passenger for a predetermined length of time by keeping the solenoids powered thereby allowing seat belt movement after the ignition switch is turned off. The operation of the timer is also controlled by the ignition switch. Whenever the state of the ignition switch changes from on to off, the timer enables current to flow to the solenoids for a predetermined period of time. The solenoids stay powered during that time and allow the retraction and extension of the seat belts.

The present invention also provides an additional safety factor by locking the seat belt retractor systems whenever power to the system is interrupted. For instance, when the vehicle is involved in a collision and the power to the solenoids is interrupted, the seat belt retractors are locked to safely restrain the driver and the passenger in their seats.

Referring to FIG. 1 where a general block diagram of the active seat belt control system of the present invention is shown, logic and timer circuit 10 (or L/T circuit 10) requires an input from the ignition switch 12, the battery 14, the right door ajar switch 18, the left door ajar switch 16, and the ground 20. The output from the L/T circuit 10 is transferred to inertia sensor 22. The output of inertia sensor 22 is connected to a pair of solenoids 24 and 26 for activating the seat belt locking mechanisms for the driver and passenger seat respectively.

The L/T circuit 10 preferably utilizes a voltage output equal in potential to that of the vehicle battery for controlling the solenoids. This is shown in FIG. 1 where 12 volts from battery 14 is used to power L/T circuit 10, the inertia sensor 22, and to drive solenoids 24 and 26. Driving the solenoids with 12 volts provides a safety benefit to the system. For instance, if the electrical wiring system fails, it is much safer for the seat belt wearers if the solenoids operate on high voltage because any grounding of the 12 volt line between L/T circuit 10 and latch mechanisms 24, 26 is readily detachable (the retractors would lock). In a low voltage system this may not be the case.

Figure 2:
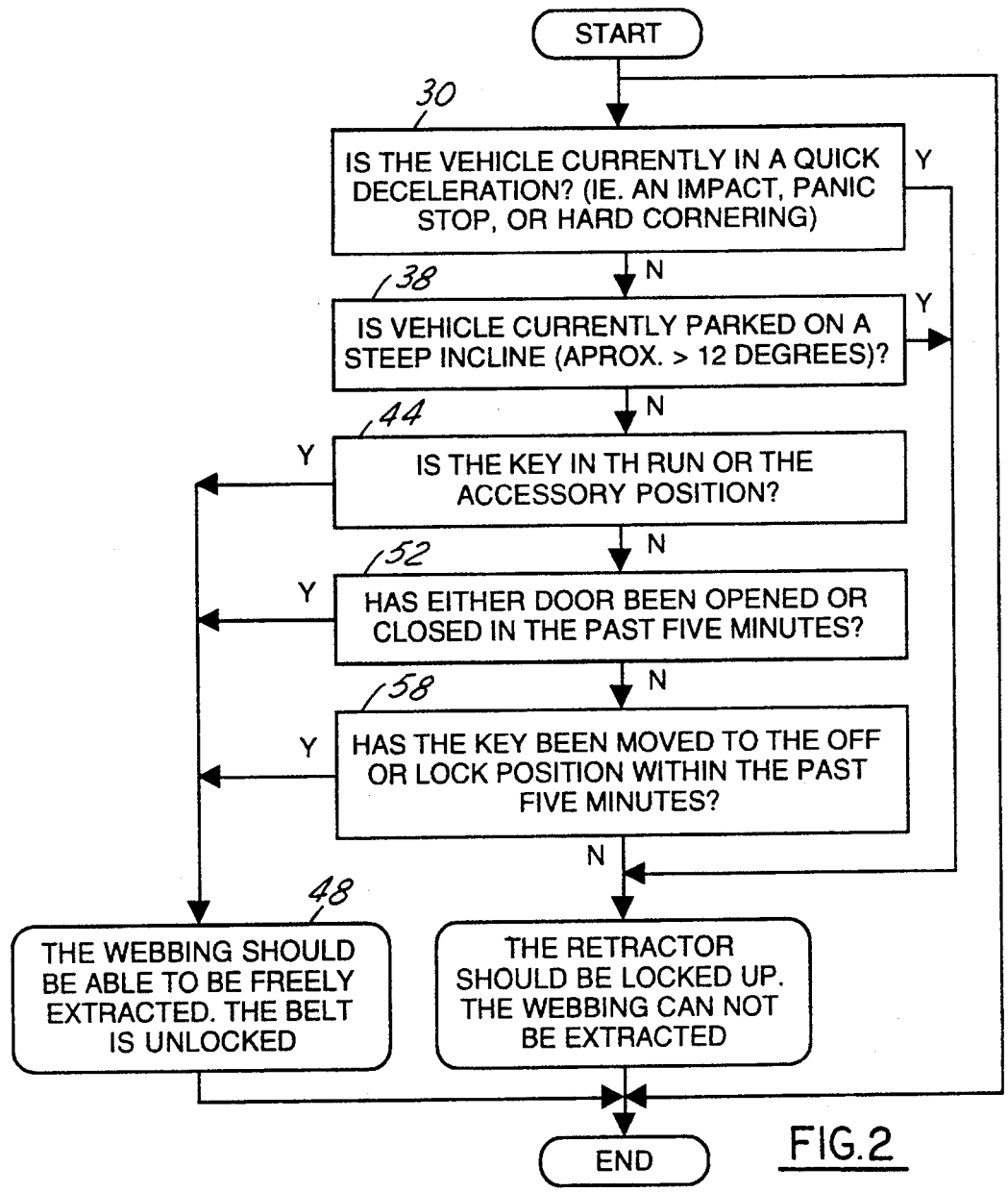
FIG. 2 is a logic flow diagram of the active seat belt control system of FIG. 1.

The logic employed by the seat belt control system is discussed below. Now referring to FIG. 2, if the vehicle is presently in a quick deceleration node 30 or the vehicle is parked on a steep incline 38 (e.g. ±12 degrees), the seat belt retractors should be locked (i.e. the seat belt wearers are restrained). However, if the answers to question blocks 30 and 38 are no, and if one or more of the following is true:
(1) the key is in the run or the accessory position 44, or
(2) a door has been opened or closed within the past five minutes 52, or
(3) the key has been moved to the off or lock position within the past five minutes 58,
then the retractor should be unlocked 48. If neither (1), (2), or (3) above can be answered in the affirmative, then the retractors are locked. This third scenario (i.e. the key has been moved to the off position within the past five minutes) anticipates the case where the driver is waiting for someone. And, if this waiting does not extend beyond a 5 minute time period, the seat belt retractors should remain unlocked.

The L/T 10 circuit is designed to receive inputs from the driver door ajar switch, the passenger door ajar switch, and the ignition switch. The system of the present invention recognizes the status of these switches and generate the appropriate response for each condition (see Table 1).

TABLE 1

| Inputs Ignition | Driver's Door WAS changed TO | | Passenger Door WAS changed TO | | Outputs Restraint |
|---|---|---|---|---|---|
| 1. Off | Open | Open | Open | Open | No change |
| 2. Off | Open | Open | Open | Close | Power xx min. |
| 3. Off | Open | Open | Close | Open | Power xx min. |
| 4. Off | Open | Open | Close | Close | No change |
| 5. Off | Open | Close | Open | Open | Power xx min. |
| 6. Off | Open | Close | Open | Close | Power xx min. |
| 7. Off | Open | Close | Close | Open | Power xx min. |
| 8. Off | Open | Close | Close | Close | Power xx min. |
| 9. Off | Close | Open | Open | Open | Power xx min. |
| 10. Off | Close | Open | Open | Close | Power xx min. |
| 11. Off | Close | Open | Close | Open | Power xx min. |
| 12. Off | Close | Open | Close | Close | Power xx min. |
| 13. Off | Close | Close | Open | Open | No change |
| 14. Off | Close | Close | Open | Close | Power xx min. |
| 15. Off | Close | Close | Close | Open | Power xx min. |
| 16. Off | Close | Close | Close | Close | No change |
| 17. On | Open | Open | Open | Open | Constant power |
| 18. On | Open | Open | Open | Close | Constant power |
| 19. On | Open | Open | Close | Open | Constant power |
| 20. On | Open | Open | Close | Close | Constant power |
| 21. On | Open | Close | Open | Open | Constant power |
| 22. On | Open | Close | Open | Close | Constant power |
| 23. On | Open | Close | Close | Open | Constant power |
| 24. On | Open | Close | Close | Close | Constant power |
| 25. On | Close | Open | Open | Open | Constant power |
| 26. On | Close | Open | Open | Close | Constant power |
| 27. On | Close | Open | Close | Open | Constant power |
| 28. On | Close | Open | Close | Close | Constant power |
| 29. On | Close | Close | Open | Open | Constant power |
| 30. On | Close | Close | Open | Close | Constant power |
| 31. On | Close | Close | Close | Open | Constant power |
| 32. On | Close | Close | Close | Close | Constant power |
| 33. On to Off | Open | Open | Open | Open | Power xx min. |
| 34. On to Off | Open | Open | Open | Close | Power xx min. |
| 35. On to Off | Open | Open | Close | Open | Power xx min. |
| 36. On to Off | Open | Open | Close | Close | Power xx min. |
| 37. On to Off | Open | Close | Open | Open | Power xx min. |
| 38. On to Off | Open | Close | Open | Close | Power xx min. |
| 39. On to Off | Open | Close | Close | Open | Power xx min. |
| 40. On to Off | Open | Close | Close | Close | Power xx min. |
| 41. On to Off | Close | Open | Open | Open | Power xx min. |
| 42. On to Off | Close | Open | Open | Close | Power xx min. |
| 43. On to Off | Close | Open | Close | Open | Power xx min. |
| 44. On to Off | Close | Open | Close | Close | Power xx min. |
| 45. On to Off | Close | Close | Open | Open | Power xx min. |
| 46. On to Off | Close | Close | Open | Close | Power xx min. |
| 47. On to Off | Close | Close | Close | Open | Power xx min. |
| 48. On to Off | Close | Close | Close | Close | Power xx min. |
| 49. Off to On | Open | Open | Open | Open | Constant power |
| 50. Off to On | Open | Open | Open | Close | Constant power |
| 51. Off to On | Open | Open | Close | Open | Constant power |
| 52. Off to On | Open | Open | Close | Close | Constant power |
| 53. Off to On | Open | Close | Open | Open | Constant power |
| 54. Off to On | Open | Close | Open | Close | Constant power |
| 55. Off to On | Open | Close | Close | Open | Constant power |
| 56. Off to On | Open | Close | Close | Close | Constant power |
| 57. Off to On | Close | Open | Open | Open | Constant power |
| 58. Off to On | Close | Open | Open | Close | Constant power |
| 59. Off to On | Close | Open | Close | Open | Constant power |
| 60. Off to On | Close | Open | Close | Close | Constant power |
| 61. Off to On | Close | Close | Open | Open | Constant power |
| 62. Off to On | Close | Close | Open | Close | Constant power |
| 63. Off to On | Close | Close | Close | Open | Constant power |

TABLE 1-continued

| Inputs Ignition | Driver's Door WAS changed TO | | Passenger Door WAS changed TO | | Outputs Restraint |
|---|---|---|---|---|---|
| 64. Off to On | Close | Close | Close | Close | Constant power |

The battery input for L/T circuit 10 should correspond to the vehicle's battery positive potential and should be capable of handling the current delivery requirements of the solenoid outputs. The ground input of the L/T circuit 10 should correspond to the negative potential of the vehicle battery and be capable of handling the current drawn by the L/T circuit 10. The ignition input for the module should correspond to the positive potential of the vehicle battery and should be used to sense the status of the ignition switch. The door ajar switch should supply L/T circuit 10 with an open circuit whenever the door is closed and a grounded circuit whenever the door is open.

An examination of Table 1 indicates that when the ignition is off, any change of the door state (from closed to open or open to closed) of either the driver door or the passenger door generates retractor unlock signal. This is shown in cases 1–16. In cases 17–32 where the ignition is on, a constant power is supplied (by way of line 109) to the solenoids to unlock the retractors. This occurs regardless of the door state changes. In cases 33–48 where the ignition switch is changed from on to off, power is supplied to the solenoids for a predetermined amount of time to enable the usage of the seat belts by keeping them in an unlocked position. In cases 49–64 where the ignition switch is changed from the off to the on position, a constant power is supplied to the solenoids unlocking the seat belt retractors.

Table 1 indicates that the outputs are on for "xx min." (i.e. a fixed time period) whenever either of the door inputs change state (opened to closed or vice versa) or the ignition input changes from the on to the off state (i.e. timer starts when a driver or passenger opens or closes a door or turns off the ignition). Fixed time period "xx" is preferably anywhere between 5–6 minutes. This fixed time cycle can be set for any desirable amount of time.

Whenever sudden motion is sensed, inertia sensors activate and the retractors are locked. This occurs regardless of the state of any of the inputs shown in FIG. 1.

Figure 3:
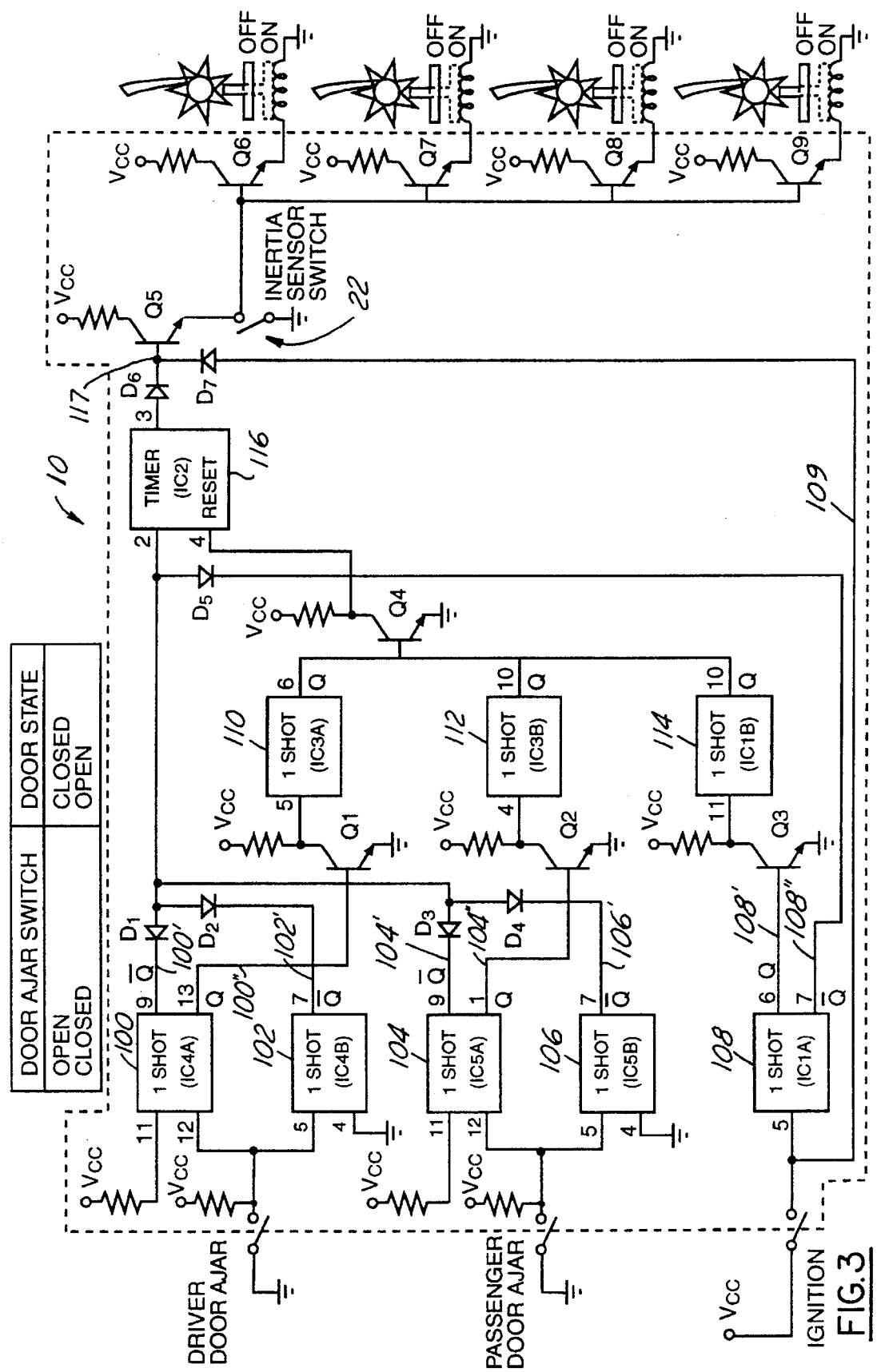
FIG. 3 is a circuit diagram of the seat belt control system incorporating a built-in inertia sensor.

Referring now to FIG. 3, where a detailed circuit diagram of the active seat belt control system of the present invention is shown. The T/L circuit 10 is preferably constructed using integrated circuit chips (indicated by IC1 through IC5). IC2 is a timer chip while the other 4 chips, IC1, IC3, IC4, and IC5 are preferably dual precision, retriggerable/resettable monostable multivibrators (hereinafter one-shots). The timer chip, IC2, is preferably a monolithic timing circuit capable of producing accurate time delays. The timer can preferably be triggered and reset on rising or falling signal edges, and the output of the timer can preferably source or sink up to 200 ma. Such a timer circuit that is suitable for the present invention is a Motorola MC1455 chip.

Figure 4:
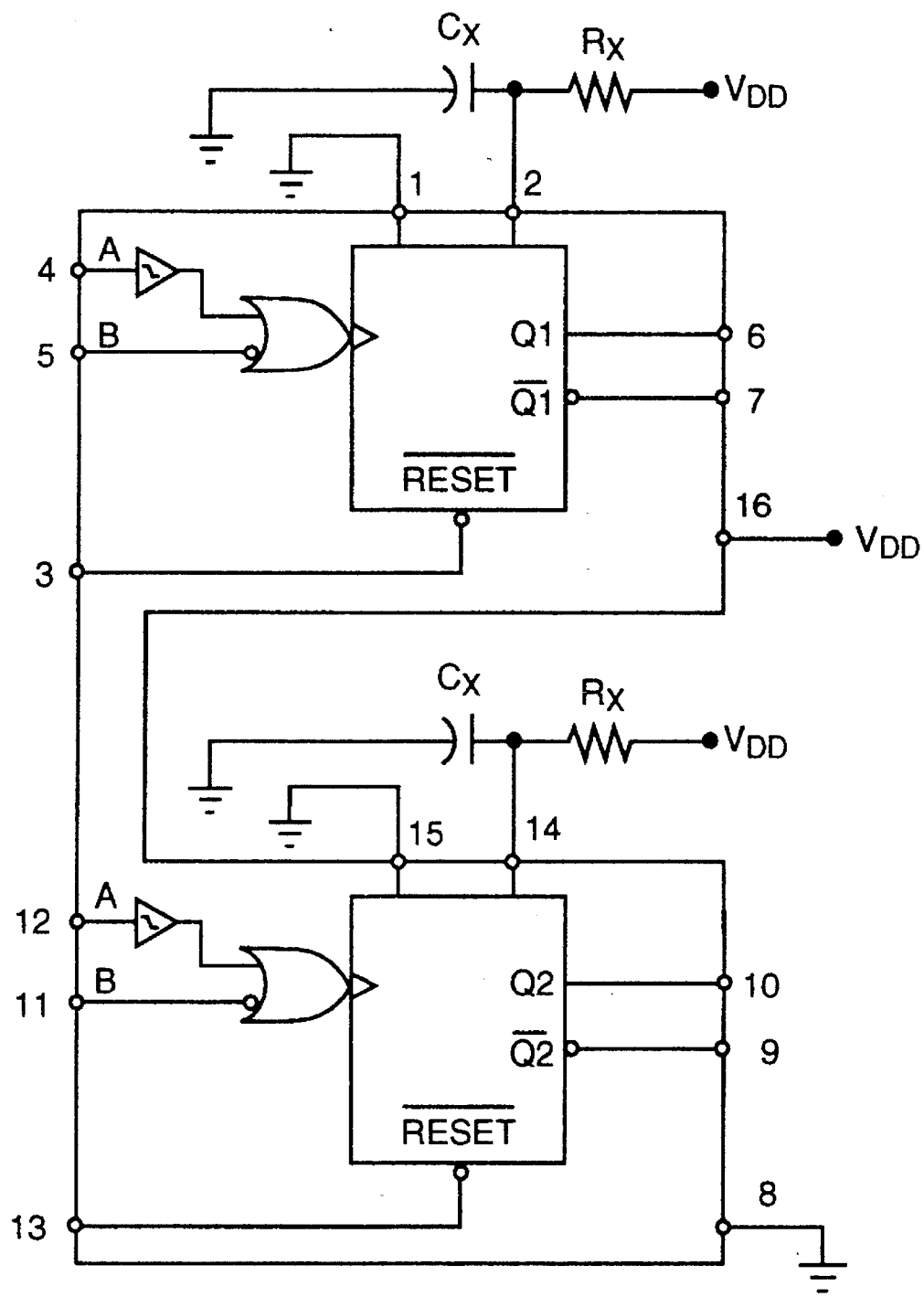
FIG. 4 is a functional block diagram of IC1 through IC5.

One-shots 100–114 may be configured to trigger from either edge of an input pulse (but not both), and produce an accurate pulse output over a wide range, the duration and the accuracy of which are determined by the external timing components (not shown). A typical one-shot that is suitable for the present invention is a Motorola MC14538B integrated circuit. A functional block diagram of the Motorola MC14538B is shown in FIG. 4.

In the circuit of FIG. 3, one shot 100, is configured to activate its outputs 100', 100" on a closed to opened transition of the driver's door and one shot 102 is configured to activate its output on an opened to closed transition of the driver's door. Thus one-shots 100 and 102 compliment one another in that whenever switch 118 changes state, an output signal is present on one of their respective output lines 100' and 102'. The respective outputs 100' and 102' are "hard wire or'ed" together move and present an input trigger signal to timer 116. The same circuit arrangement is used to sense passenger door change of state and outputs 104' and 106' are "hard wire-or'ed" together and presented as an input trigger signal to timer 116. When either of the doors move from a closed to open position, output signals 100" and 104" are sensed by one-shots 110, 112 respectively, which, in turn reset timer 116. This guarantees that timer 116 is reset (regardless of where it is in its current timing cycle) whenever a door status changes so that it can begin another fixed time cycle (i.e. a fixed time cycle begins each time the driver or passenger door is closed).

One-shot 108 controls the ignition off signal lines 108' and 108". Line 108" sets the timer (i.e. turns the timer on if not already so, but does not interfere with its timing cycle if already initiated) for the fixed time cycle when the ignition switch is turned off. Line 108' functions similarly to that of the other one-shots to reset timer 116 (i.e. causes the timer to initiate a new timing cycle regardless of where it is in the current timing cycle) when the ignition is turned off. Line 109 runs from pin 5 of IC1A to node 117. Line 109 ensures that whenever ignition is turned on, node 109 is held at 12 volts thus ensuring that the timer is ineffective for locking the retractors while the ignition is on. Transistors Q1–Q9 are used as inverter/drivers in a conventional manner. Diodes, D1–D7 allow current to flow only in one direction.

Now referring to FIGS. 5A through 5G, when the driver door moves from a closed position to an open position (see FIG. 5A), the voltage at pin 9 of one-shot 100 drops to zero for a short period of time (preferably in the range of 1–100 milliseconds) then rises back to 12 volts (see FIG. 5B). The voltage signal at pin 5 of one-shot 110 is shown in FIG. 5E and essentially duplicates the voltage signal of FIG. 5B. The signal shown in FIG. 5E triggers one-shot 110 and causes the output of one-shot 110 to generate the signal shown in FIG. 5F. The rising edge of the signal of FIG. 5B triggers timer 116 (see FIG. 5D) thereby setting timer 116 to run for a fixed time. After this fixed time is expired, the output of timer 116 drops to zero volts causing the seat belt retractors to lock.

In the case where the driver's door experiences an opened to closed transition (see FIGS. 5A and 5C) the output of one-shot 102 drops to zero volts for a brief period of time before rising once again to 12 volts. This rising edge triggers timer 116 (see FIG. 5D) thereby initiating the fixed time period for timer 116. When timer 116 is engaged in its fixed time period, power is provided to node 117 by way of pin 3 of timer 116. This provides current to the retractors thereby releasing them from their engaged position.

When ignition switch 122 is turned on, line 109 is brought to a 12 volt potential thereby lifting node 117 to that same potential. As long as node 117 is kept at a 12 volt potential, the seat belt retractors remain in their unlocked position. Soon after the ignition is turned off (see FIG. 5G) timer 116 is triggered to initiate its fixed time cycle by way of the input it receives from one-shot 114. During this fixed time cycle, node 117 remains at a 12 volt potential and the seat belt retractors remain in their unlocked position.

One additional advantage of the present invention is the incorporation of a built-in inertia sensor in the L/T circuit 10. As shown in FIG. 3, the gravity sensor 22 is connected to the emitter of Q5. If inertia sensor 22 senses a sudden deceleration or hard cornering it connects the emitter of Q5 to ground thereby locking each of the retractors.

By incorporating a built-in inertia sensor in the L/T circuit 10, a more reliable system is achieved. The system is more reliable because there are less components to fail. Also, the present invention provides the benefits of a faster response time and a vehicle component which is easier to service.

The foregoing detailed description shows that the preferred embodiments of the present invention are well suited to fulfill the objects of the invention. It is to be recognized that those skilled in the art may make various modifications or additions to the preferred embodiments chosen here to illustrate the present invention, without departing from the spirit of the present invention. Accordingly, it is to be understood that the subject matter sought to be afforded protection hereby should be deemed to extend to the subject matter defined in the appended claims, including all fair equivalents thereof.

We claim:

1. An active seat belt control system for controlling the locking and unlocking of a seat belt retractor in a vehicle comprising:

first detection means responsive to the opening and closing of a vehicle door and capable of generating a first output signal indicating the state of said door, second detection means responsive to the on/off state of an ignition switch and capable of generating a second output signal indicating the state of said ignition switch, first control means responsive to said first output signal and said second output signal and capable of generating a third output signal, timer means for starting a timing sequence for a preset time period when triggered by said third output signal, impact sensing means built-in with said control system responsive to a sudden vehicle motion for generating a fourth output signal, and second control means responsive to said third output signal of said timer means, for enabling the unlocking of said seat belt retractor for said preset time period, said second control means also responsive to said fourth output signal for overriding said third output signal and locking said seat belt retractor for the duration of said fourth output signal.

2. An active seat belt control system according to claim 1, wherein said second control means is connected to said ignition switch and, when said ignition switch is in said on state, said second control means overrides said third output signal and enables said seat belt retractors to remain in an unlocked state.

3. An active seat belt control system according to claim 1, wherein said impact sensing means is an inertia sensor.

4. An active seat belt control system according to claim 1, wherein said first detection means comprises at least one detection circuit for detecting the opening and closing state of said vehicle door.

5. An active seat belt control system according to claim 1, wherein said first control means includes at least one flip-flop integrated circuit chip.

6. An active seat belt control system according to claim 1, wherein said second control means includes at least one solenoid.

7. An active seat belt control system according to claim 1, wherein said second control means includes at least one solenoid activated either by output signals from said timer means or by the fourth output signal from said impact sensing means.

* * * * *